UNITED STATES PATENT OFFICE.

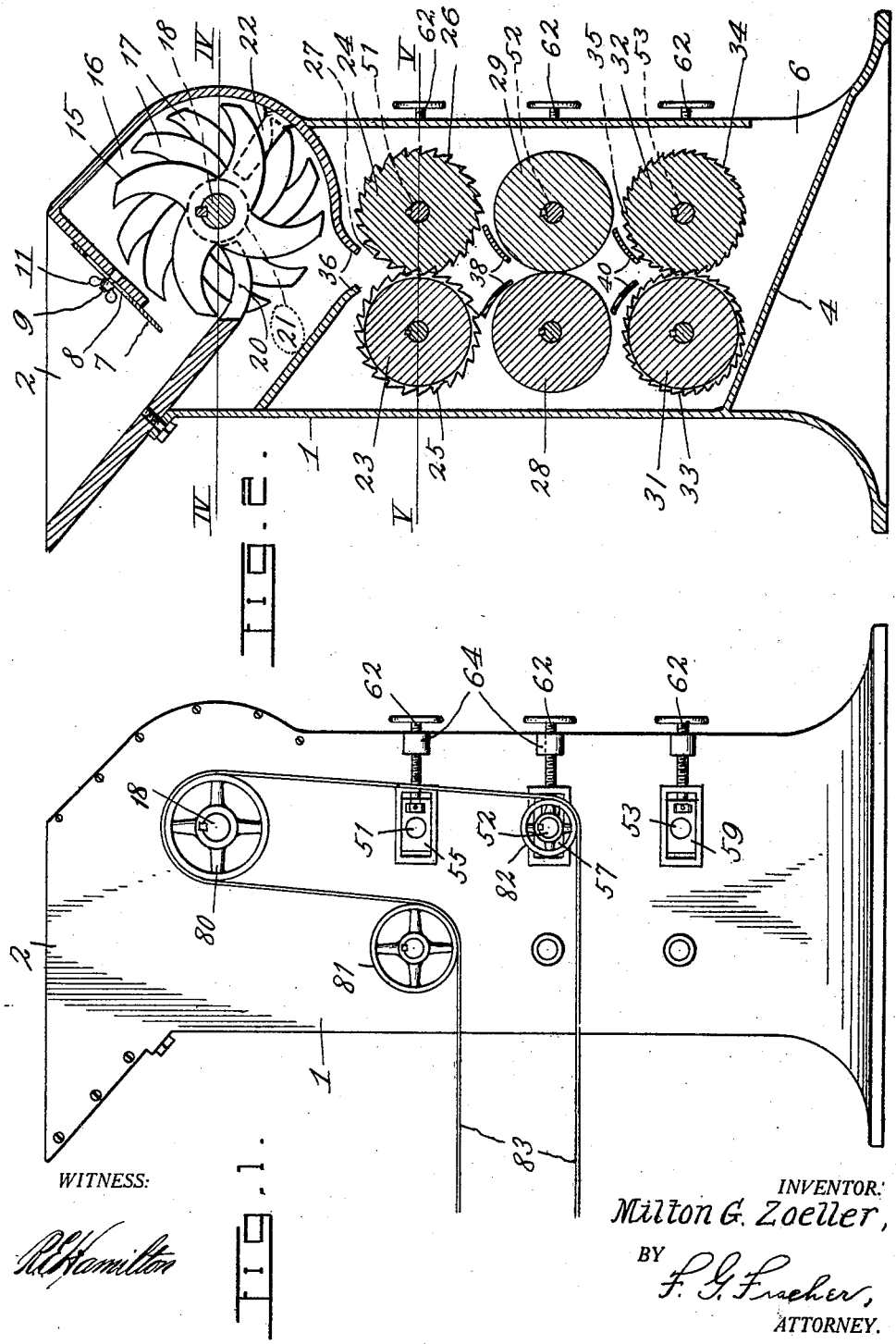

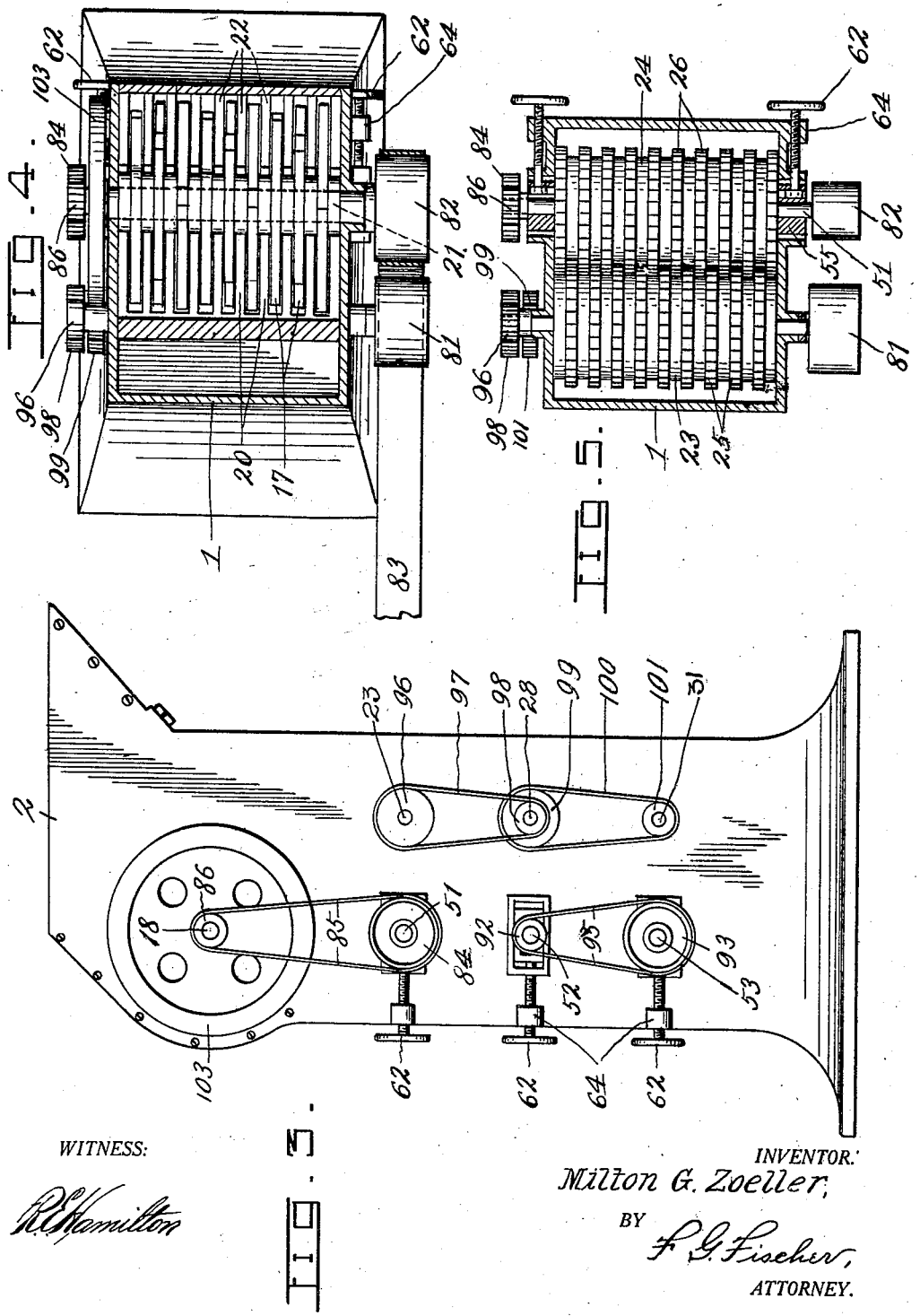

MILTON G. ZOELLER, OF KANSAS CITY, MISSOURI.

FEED-MILL.

1,312,717.  Specification of Letters Patent.  Patented Aug. 12, 1919.

Application filed December 23, 1918. Serial No. 267,920.

*To all whom it may concern:*

Be it known that I, MILTON G. ZOELLER, a citizen of the United States, residing at Kansas City, in the county of Jackson and State of Missouri, have invented certain new and useful Improvements in Feed-Mills, of which the following is a specification.

My invention relates to feed mills and my object is to provide a comparatively simple, inexpensive and efficient machine of this character whereby green, wet and dry feed such as corn fodder, alfalfa, etc., can be reduced to the condition of meal in order to render it more desirable as a stock food.

The invention consists of the coacting elements hereinafter described and pointed out in the claims, and in order that said invention may be fully understood, reference will now be made to the accompanying drawings, in which:

Figure 1 is a side elevation of the mill.

Fig. 2 is a vertical sectional view of the mill.

Fig. 3 shows the opposite side of the mill from that disclosed by Fig. 1.

Fig. 4 is a horizontal section on line IV—IV of Fig. 2.

Fig. 5 is a horizontal section on line V—V of Fig. 2.

In carrying out the invention, I employ an upright housing 1, provided at its upper end with a hopper 2 to receive the material to be ground, and at its lower portion with an inclined bottom 4 which discharges the ground material through an outlet 6 in one side of said housing 1. The flow of the material from the hopper is regulated by an adjustable gate 7 having a slot 8 through which a bolt 9 extends from one side of the inclined bottom of the hopper. A wing-nut 11 threaded upon the bolt 9 is adapted to bear upon the gate 7 and secure it in any of its adjusted positions.

15 designates a rotary cutter arranged in a chamber 16 below one side of the hopper bottom. Said cutter 15 comprises blades 17 keyed or otherwise rigidly mounted upon a shaft 18, journaled in opposite sides of the chamber 16. As disclosed on Fig. 2, the blades 17 are not arranged in alinement, but rather spirally upon the shaft 18, and hence less power is required to drive said shaft 18 as only one or two blades act upon the material at the same time. The blades 17 are curved to draw the material toward the shaft 18, where less power is required to chop corn on the cob or other hard material than out at the terminals of said blades. The curvature of the blades 17 also overcomes any tendency of the material to slip outwardly away from the blade terminals where it could not be acted upon.

Stationary knives 20 formed integral with or otherwise firmly secured to one side of the hopper bottom coact with the blades 17 in chopping and tearing up the material. Said stationary knives 20 are spaced apart to admit the passage of the blades 17, which are spaced apart by spacing-sleeves 21 mounted upon the shaft 18. The stationary knives 20 curve upwardly toward the shaft 18 and terminate adjacent the peripheries of the spacing-sleeves 21, to prevent the material from falling over the terminals of said knives 20. Thus the material is supported upon the knives 20 until reduced sufficiently by the blades 17 to pass through the spaces between said knives 20.

22 designates a row of teeth fixed to a wall of the chamber 16 and projecting into the spaces between the blades 17, to clean out any particles of material lodged in said spaces.

23 and 24 designate a pair of reduction rolls having peripheral rows of ratchet-like teeth 25 and 26, respectively, to reduce the material to a finer state after being acted upon by the rotary cutter 15 and the stationary knives 20. The peripheral rows of teeth 25 and 26 are spaced apart and so disposed that the teeth on one roll pass through the spaces on the opposite roll, thus it will be impossible for the material to pass between said rolls 23 and 24 without being acted upon by the teeth 25 and 26. To further increase the efficiency of the rolls 23 and 24, the roll 24 is driven at a lower speed than the roll 23 and has the abrupt sides 27 of its teeth 26 so disposed as to support the material while it is acted upon by the teeth 25.

28 and 29 designate a pair of smooth intermediate reduction rolls disposed below the rolls 23 and 24 to crush the material and feed it, substantially, in the form of a sheet to a pair of underlying reduction rolls 31 and 32 having peripheral rows of ratchet-like teeth 33 and 34, respectively, which are finer than the teeth 25 and 26 in order to reduce the material to a finer state. The teeth 33 and 34, like the teeth 25 and 26 are spaced apart, so that the teeth on one roll can pass through the spaces on the companion roll, and their effectiveness in grinding and tearing the material is enhanced by driving the roll 31 at a higher speed than the roll 32 and disposing the abrupt side 35 of the teeth 34, in a manner to support the material while being acted upon by the teeth 33.

The material is directed between the upper rolls 23 and 24 by guides 36, between the intermediate rolls by guides 38, and between the lowermost rolls 31 and 32 by guides 40.

In order that the distance between each pair of rolls may be increased or diminished according to the fineness to which it is desired to reduce the material, I mount the shaft 51, 52 and 53 of the rolls 24, 29 and 32 in boxes 55, 57 and 59, respectively, which are slidably mounted in opposite sides of the housing 1. Each box is adjusted backwardly or forwardly by a hand-screw 62 threaded in a nut 64 on the housing 1.

The rotary cutter 15 and the rollers 23 and 29 are provided with pulleys 80, 81 and 82, respectively, driven by a belt 83, which may receive its power from any suitable source, not shown. The roller 24 is provided with a pulley 84 driven by a belt or chain 85 from a pulley 86 on the cutter 15. The roller 29 drives the roller 32 through the intermediacy of pulleys 92 and 93 and an endless belt or chain 95. The roller 23 is provided with a pulley 96 which drives a chain or belt 97 which drives a pulley 98 on the roller 28. The roller 28 is provided with a second pulley 99 which drives a chain or belt 100 running around a pulley 101 which drives the roller 31.

Owing to the variable resistance which the material offers to the rotary cutter 15, I provide the shaft 18 with a fly wheel 103 to impart a steady motion to said cutter 15. The reduction rolls may also be provided with fly wheels, not shown, but I deem this unnecessary as they are not subjected to the variable resistance above-referred to.

In practice the material is thrown into the hopper 2 and as it falls upon the stationary knives 20 it is chopped into small particles by the rotary cutter 15. The small particles are then progressively reduced to a meal of desired fineness by the three pairs of reduction rollers and finely discharged through the outlet 6. In order that there may be no danger of the machine becoming clogged the upper roll 23 is geared to travel faster than the rotary cutter 15, the intermediate rolls 28 and 29 are geared to travel faster than the upper roll 23, and the lower roll 31 is geared to travel faster than said intermediate rolls.

From the foregoing it is apparent that I have produced a machine possessing the advantages above-pointed out, and while I have shown and described the preferred form of the invention, I reserve the right to make such changes in the construction, proportion, and arrangement of parts as properly fall within the spirit and scope of the claims.

Having thus described my invention what I claim and desire to secure by Letters Patent, is:

1. In a machine of the character described, a housing, a hopper communicating with the upper portion of said housing to receive the material to be reduced, a rotary cutter for cutting the material received from said hopper, a pair of coarse toothed reduction rolls arranged in the housing beneath said rotary cutter to act on the material received therefrom, a pair of smooth rolls arranged beneath said coarse toothed rolls to crush the material received therefrom, and a pair of fine toothed reduction rolls arranged beneath said smooth rolls to act on the material received therefrom, substantially as described.

2. In a machine of the character described, a housing, a hopper communicating with the upper portion of said housing to receive the material to be reduced, stationary knives spaced apart at the bottom of said hopper, a rotary cutter consisting of blades spaced apart to pass through the spaces between said stationary knives and cut up the material received from the hopper, a pair of coarse toothed reduction rolls arranged in the housing beneath said rotary cutter to act on the material received therefrom, a pair of smooth rolls to crush the material received therefrom, and a pair of fine toothed reduction rolls arranged beneath said smooth rolls to act on the material received therefrom, substantially as described.

3. In a machine of the character described, a housing, a hopper communicating with the upper portion of said housing to receive the material to be reduced, stationary knives spaced apart at the bottom of said hopper and curved upwardly to support the material thereon, a rotary cutter consisting of curved blades spaced apart to pass through the spaces between said stationary knives and cut up the material resting on the stationary knives, a pair of coarse toothed reduction rolls arranged in the housing beneath said rotary cutter to act on the material received therefrom, a pair of smooth rolls to crush the material received therefrom, and a pair of fine toothed reduction rolls arranged beneath said smooth rolls to act on the material received therefrom, substantially as described.

4. In a machine of the character described, a housing, a hopper communicating with the upper portion of said housing to receive the material to be reduced, stationary knives spaced apart at the bottom of said hopper and curved upwardly to support the material thereon, a rotary cutter consisting of curved blades spaced apart to pass through the spaces between said stationary knives and cut up the material resting on the stationary knives, a pair of coarse toothed reduction rolls arranged in the housing beneath said rotary cutter to act on the material received therefrom, a pair of smooth rolls to crush the material received therefrom, a pair of fine toothed reduction rolls arranged beneath said smooth rolls to act on the material received therefrom, and means for adjusting one of each pair of rolls into proper relation with its companion, substantially as described.

5. In a machine of the character described, a housing, a hopper communicating with the upper portion of said housing to receive the material to be reduced, stationary knives spaced apart at the bottom of said hopper, a rotary cutter consisting of blades spaced apart to pass through the spaces between said stationary knives and cut up the material received from the hopper, a pair of coarse toothed reduction rolls arranged in the housing beneath said rotary cutter to act on the material received therefrom, a pair of smooth rolls to crush the material received therefrom, a pair of fine toothed reduction rolls arranged beneath said smooth rolls to act on the material received therefrom, and guides in the housing for directing the material to the respective rolls, substantially as described.

6. In a machine of the character described, a housing, a hopper communicating with the upper portion of said housing to receive the material to be reduced, a rotary cutter for cutting the material received from said hopper, a pair of coarse toothed reduction rolls arranged in the housing beneath said rotary cutter to act on the material received therefrom, a pair of smooth rolls arranged beneath said coarse toothed rolls to crush the material received therefrom, a pair of fine toothed reduction-rolls arranged beneath said smooth rolls to act on the material received therefrom, and an inclined bottom to direct the ground material to an outlet in the housing, substantially as described.

7. In a machine of the character described, a housing, a hopper communicating with the upper portion of said housing to receive the material to be reduced, stationary knives spaced apart at the bottom of said hopper, a rotary cutter consisting of blades spaced apart to pass through the spaces between said stationary knives and cut up the material received from the hopper, teeth projecting into the spaces between the cutter blades, a pair of coarse toothed reduction rolls arranged in the housing beneath said rotary cutter to act on the material received therefrom, a pair of smooth rolls to crush the material received therefrom, and a pair of fine toothed reduction rolls arranged beneath said smooth rolls to act on the material received therefrom, substantially as described.

8. In a machine of the character described, a housing, a hopper communicating with the upper portion of said housing to receive the material to be reduced, a rotary cutter for cutting the material received from said hopper, a pair of coarse toothed reduction rolls arranged in the housing beneath said rotary cutter to act on the material received therefrom, a pair of smooth rolls arranged beneath said coarse toothed rolls to crush the material received therefrom, means for driving said smooth rolls faster than the coarse toothed rolls, a pair of fine toothed rolls arranged beneath said smooth rolls, and means for driving one of the fine toothed rolls faster than the smooth rolls.

In testimony whereof I affix my signature, in the presence of two witnesses.

MILTON G. ZOELLER.

Witnesses:
F. G. FISCHER,
L. J. FISCHER.

Copies of this patent may be obtained for five cents each, by addressing the "Commissioner of Patents, Washington, D. C."